(12) United States Patent
Andreasen et al.

(10) Patent No.: US 7,643,411 B2
(45) Date of Patent: Jan. 5, 2010

(54) NETWORK-TRIGGERED QUALITY OF SERVICE (QOS) RESERVATION

(75) Inventors: Flemming S. Andreasen, Marlboro, NJ (US); Jayaraman R. Iyer, Sunnyvale, CA (US); Jonathan D. Rosenberg, Freehold, NJ (US); Biswaranjan Panda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/715,250

(22) Filed: Mar. 6, 2007

(65) Prior Publication Data
US 2007/0206617 A1    Sep. 6, 2007

Related U.S. Application Data

(60) Provisional application No. 60/780,176, filed on Mar. 6, 2006.

(51) Int. Cl.
*G01R 31/08* (2006.01)
*H04L 12/28* (2006.01)
*H04W 4/00* (2006.01)

(52) U.S. Cl. .................. 370/229; 370/401; 370/329; 370/395.21

(58) Field of Classification Search ............... 370/229, 370/230, 401, 395.21, 395.41, 395.43, 395.2, 370/328–329, 392.2
See application file for complete search history.

(56) References Cited

U.S. PATENT DOCUMENTS

| 5,602,907 A | 2/1997 | Hata et al. ............. 379/114 |
| 5,822,411 A | 10/1998 | Swale et al. ............ 379/111 |
| 5,828,737 A | 10/1998 | Sawyer .................. 379/114 |
| 5,905,736 A | 5/1999 | Ronen et al. ............ 370/546 |

(Continued)

FOREIGN PATENT DOCUMENTS

WO    WO 98/26381    6/1998

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

(Continued)

*Primary Examiner*—Kwang B Yao
*Assistant Examiner*—Candal Elpenord
(74) *Attorney, Agent, or Firm*—Baker Botts L.L.P.

(57) ABSTRACT

A method includes a network originating a QoS reservation message and communicating the network-originated QoS message through a radio access network (RAN) from an access gateway (AGW) to an access terminal (AT). The network-originated reservation message does not cause any network resource reservation by itself, but causes the AT to initiate a network resource reservation according to one or more parameters in the network-originated QoS reservation message. Accordingly, an existing network infrastructure supporting AT-originated QoS reservation may support network-originated QoS reservation (or proxied QoS) without any updates to an access-network infrastructure, such as the RAN. The method includes, in response to the network-initiated QoS reservation message, communicating a reservation confirmation through the RAN from the AT to the AGW. The reservation confirmation whether that the QoS reservation was successful.

35 Claims, 2 Drawing Sheets

U.S. PATENT DOCUMENTS

| | | | |
|---|---|---|---|
| 5,909,238 A | 6/1999 | Nagashima et al. ............. 348/3 |
| 5,946,670 A | 8/1999 | Motohashi et al. .......... 705/400 |
| 5,956,391 A | 9/1999 | Melen et al. ................. 379/114 |
| 5,970,477 A | 10/1999 | Roden .......................... 705/32 |
| 5,987,498 A | 11/1999 | Athing et al. ............... 709/203 |
| 6,016,509 A | 1/2000 | Dedrick ....................... 709/224 |
| 6,035,281 A | 3/2000 | Crosskey et al. .............. 705/14 |
| 6,047,051 A | 4/2000 | Ginzboorg et al. .......... 379/130 |
| 6,070,192 A | 5/2000 | Holt et al. ................... 709/227 |
| 6,075,854 A | 6/2000 | Copley et al. ............... 379/211 |
| 6,131,024 A | 10/2000 | Boltz ........................... 455/405 |
| 6,137,791 A | 10/2000 | Frid et al. .................... 370/352 |
| 6,141,684 A | 10/2000 | McDonald et al. .......... 709/222 |
| 6,175,879 B1 | 1/2001 | Shah et al. ................... 709/330 |
| 6,208,977 B1 | 3/2001 | Hernandez et al. ............ 705/34 |
| 6,229,887 B1 | 5/2001 | Albers et al. ................. 379/219 |
| 6,282,573 B1 | 8/2001 | Darago et al. ............... 709/229 |
| 6,295,447 B1 | 9/2001 | Reichelt et al. .............. 455/417 |
| 6,330,562 B1 | 12/2001 | Boden et al. ................... 707/10 |
| 6,332,163 B1 | 12/2001 | Bowman-Amauh ......... 709/231 |
| 6,339,832 B1 | 1/2002 | Bowman-Amauh ........... 714/35 |
| 6,434,568 B1 | 8/2002 | Bowman-Amauh ..... 707/103 R |
| 6,434,628 B1 | 8/2002 | Bowman-Amauh ........... 714/48 |
| 6,438,594 B1 | 8/2002 | Bowman-Amauh ......... 709/225 |
| 6,442,748 B1 | 8/2002 | Bowman-Amauh ......... 717/108 |
| 6,466,964 B1 | 10/2002 | Leung et al. ................. 709/202 |
| 6,477,580 B1 | 11/2002 | Bowman-Amauh ......... 709/231 |
| 6,477,665 B1 | 11/2002 | Bowman-Amauh ........... 714/39 |
| 6,480,485 B1 | 11/2002 | Kari et al. .................... 370/352 |
| 6,490,451 B1 | 12/2002 | Denman et al. .............. 455/436 |
| 6,493,547 B1 | 12/2002 | Raith ........................... 455/405 |
| 6,496,850 B1 | 12/2002 | Bowman-Amauh ......... 709/203 |
| 6,502,213 B1 | 12/2002 | Bowman-Amauh ........... 714/49 |
| 6,510,513 B1 | 1/2003 | Danieli ........................ 713/156 |
| 6,529,909 B1 | 3/2003 | Bowman-Amauh ........... 707/10 |
| 6,529,948 B1 | 3/2003 | Bowman-Amauh ......... 709/217 |
| 6,539,396 B1 | 3/2003 | Bowman-Amauh ..... 707/103 R |
| 6,549,949 B1 | 4/2003 | Bowman-Amauh ......... 709/236 |
| 6,550,057 B1 | 4/2003 | Bowman-Amauh ......... 717/126 |
| 6,571,282 B1 | 5/2003 | Bowman-Amauh ......... 709/219 |
| 6,578,068 B1 | 6/2003 | Bowman-Amauh ......... 709/203 |
| 6,601,192 B1 | 7/2003 | Bowman-Amauh ........... 714/38 |
| 6,601,234 B1 | 7/2003 | Bowman-Amauh ......... 717/108 |
| 6,606,660 B1 | 8/2003 | Bowman-Amauh ......... 709/227 |
| 6,611,821 B2 | 8/2003 | Stahl et al. ................... 705/400 |
| 6,615,199 B1 | 9/2003 | Bowman-Amauh ........... 706/50 |
| 6,615,253 B1 | 9/2003 | Bowman-Amauh ......... 709/219 |
| 6,615,263 B2 | 9/2003 | Dulai et al. .................. 709/225 |
| 6,621,820 B1 | 9/2003 | Williams et al. ........ 370/395.31 |
| 6,636,242 B2 | 10/2003 | Bowman-Amauh ......... 715/764 |
| 6,640,238 B1 | 10/2003 | Bowman-Amauh ......... 709/201 |
| 6,640,244 B1 | 10/2003 | Bowman-Amauh ......... 709/207 |
| 6,647,262 B1 | 11/2003 | Demetrescu et al. ........ 455/436 |
| 6,665,537 B1 | 12/2003 | Lioy ............................ 455/435 |
| 6,665,718 B1 | 12/2003 | Chuah et al. ................ 709/225 |
| 6,671,675 B2 | 12/2003 | Iwamura ....................... 705/30 |
| 6,684,243 B1 | 1/2004 | Euget et al. .................. 709/222 |
| 6,684,256 B1 | 1/2004 | Warrier et al. ............... 709/238 |
| 6,708,225 B1 | 3/2004 | Cho et al. .................... 709/317 |
| 6,714,515 B1 | 3/2004 | Marchand ................... 370/231 |
| 6,715,145 B1 | 3/2004 | Bowman-Amauh ......... 718/101 |
| 6,728,266 B1 | 4/2004 | Sabry et al. .................. 370/468 |
| 6,728,365 B1 | 4/2004 | Li et al. ....................... 379/329 |
| 6,728,884 B1 | 4/2004 | Lim ............................. 713/201 |
| 6,742,015 B1 | 5/2004 | Bowman-Amauh ......... 718/101 |
| 6,742,036 B1 | 5/2004 | Das et al. ..................... 709/226 |
| 6,757,371 B2 | 6/2004 | Kim et al. ................ 379/114.22 |
| 6,760,444 B1 | 7/2004 | Leung ......................... 380/270 |
| 6,768,726 B2 | 7/2004 | Dorenbosch et al. ........ 370/331 |
| 6,769,000 B1 | 7/2004 | Akhtar et al. ........... 707/103 R |
| 6,771,623 B2 | 8/2004 | Ton ............................. 370/331 |
| 6,785,256 B2 | 8/2004 | O'Neill ........................ 370/338 |
| 6,804,518 B2 | 10/2004 | Core et al. ................... 455/436 |
| 6,826,173 B1 | 11/2004 | Kung et al. .................. 370/352 |
| 6,829,709 B1 | 12/2004 | Acharya et al. ............. 713/160 |
| 6,834,341 B1 | 12/2004 | Bahl et al. ................... 713/156 |
| 6,839,338 B1 | 1/2005 | Amara et al. ................ 370/338 |
| 6,842,906 B1 | 1/2005 | Bowman-Amauh ......... 719/330 |
| 6,856,676 B1 | 2/2005 | Pirot et al. .............. 379/201.01 |
| 6,889,321 B1 | 5/2005 | Kung et al. .................. 713/153 |
| 6,907,501 B2 | 6/2005 | Tariq et al. .................. 711/118 |
| 6,910,074 B1 | 6/2005 | Amin et al. .................. 709/227 |
| 6,915,345 B1 | 7/2005 | Tummala et al. ............ 709/225 |
| 6,917,605 B2 | 7/2005 | Kakemizu et al. ........... 370/338 |
| 6,920,503 B1 | 7/2005 | Nanji et al. .................. 709/230 |
| 6,922,404 B1 | 7/2005 | Narayanan et al. .......... 370/338 |
| 6,925,160 B1 | 8/2005 | Stevens et al. .......... 379/121.05 |
| 6,947,401 B2 | 9/2005 | El-Malki et al. ............. 370/331 |
| 6,961,774 B1 | 11/2005 | Shannon et al. ............. 709/227 |
| 6,967,941 B2 | 11/2005 | Roy ............................. 370/338 |
| 6,978,128 B1 | 12/2005 | Raman et al. ................ 455/414 |
| 6,980,802 B2 | 12/2005 | Jung ............................ 455/436 |
| 6,980,962 B1 | 12/2005 | Arganbright et al. ........... 705/26 |
| 6,981,047 B2 | 12/2005 | Hanson et al. ............... 709/227 |
| 6,982,967 B1 | 1/2006 | Leung .......................... 370/328 |
| 6,990,337 B2 | 1/2006 | O'Neill et al. ............ 455/422.1 |
| 6,993,333 B2 | 1/2006 | Laroia et al. ................. 455/436 |
| 7,003,294 B2 | 2/2006 | Singhai et al. ............ 455/435.1 |
| 7,020,697 B1 | 3/2006 | Goodman et al. ........... 709/223 |
| 7,024,687 B2 | 4/2006 | Chaudhuri et al. .............. 726/3 |
| 7,028,311 B2 | 4/2006 | Roach et al. ................. 719/328 |
| 7,039,027 B2 | 5/2006 | Bridgelall ................... 370/329 |
| 7,054,268 B1 | 5/2006 | Paranteinen et al. ........ 370/231 |
| 7,065,092 B2* | 6/2006 | Chen et al. .............. 370/395.52 |
| 7,079,499 B1 | 7/2006 | Akhtar et al. ................ 370/310 |
| 7,082,301 B2 | 7/2006 | Jagadeesan et al. ......... 455/436 |
| 7,103,359 B1 | 9/2006 | Heinonen et al. ............ 455/436 |
| 7,127,234 B2 | 10/2006 | Ishii ............................. 455/411 |
| 7,130,286 B2 | 10/2006 | Koodli et al. ................ 370/331 |
| 7,133,386 B2 | 11/2006 | Holur et al. .................. 370/331 |
| 7,151,758 B2 | 12/2006 | Kumaki et al. .............. 370/331 |
| 7,151,772 B1 | 12/2006 | Kalmanek et al. ........... 370/390 |
| 7,154,868 B1 | 12/2006 | Sharma et al. ............... 370/331 |
| 7,161,914 B2 | 1/2007 | Shoaib et al. ................ 370/331 |
| 7,171,555 B1 | 1/2007 | Salowey et al. ............. 713/156 |
| 7,181,532 B1* | 2/2007 | Chan ........................... 709/242 |
| 7,184,418 B1 | 2/2007 | Baba et al. ................... 370/331 |
| 7,187,931 B2 | 3/2007 | Trossen ....................... 455/440 |
| 7,190,793 B2 | 3/2007 | Hsu ............................. 380/270 |
| 7,197,763 B2 | 3/2007 | Hsu ................................ 726/4 |
| 7,212,821 B2 | 5/2007 | Laroia et al. ................. 455/437 |
| 7,230,951 B2 | 6/2007 | Mizell et al. ................. 370/401 |
| 7,233,583 B2 | 6/2007 | Asthana et al. .............. 370/332 |
| 7,251,733 B2 | 7/2007 | Haverinen et al. ........... 713/182 |
| 7,263,371 B2 | 8/2007 | Das et al. ................... 455/456.1 |
| 7,269,727 B1 | 9/2007 | Mukherjee et al. .......... 713/160 |
| 7,272,122 B2 | 9/2007 | Trossen et al. ............... 370/331 |
| 7,272,123 B2 | 9/2007 | Wall ............................ 370/331 |
| 7,275,156 B2 | 9/2007 | Balfanz et al. ............... 713/168 |
| 7,336,607 B2* | 2/2008 | Samadi et al. ............. 370/230.1 |
| 7,369,536 B2* | 5/2008 | Donovan et al. ............ 370/352 |
| 7,389,106 B2 | 6/2008 | Dawson et al. .............. 455/406 |
| 2001/0023428 A1 | 9/2001 | Miyazaki et al. ............ 709/201 |
| 2002/0021681 A1 | 2/2002 | Madour ....................... 370/331 |
| 2002/0023174 A1 | 2/2002 | Garrett et al. ................ 709/245 |
| 2002/0036982 A1* | 3/2002 | Chen ............................ 370/230 |
| 2002/0059114 A1 | 5/2002 | Cockrill et al. ................ 705/27 |
| 2002/0091802 A1* | 7/2002 | Paul et al. .................... 709/220 |
| 2002/0138601 A1 | 9/2002 | Piponius et al. ............. 709/223 |
| 2002/0147828 A1* | 10/2002 | Chen et al. ................... 709/231 |
| 2002/0151312 A1 | 10/2002 | Rosemarijn Bos et al. .. 455/452 |
| 2003/0021252 A1 | 1/2003 | Harper et al. ................ 370/338 |
| 2003/0039237 A1 | 2/2003 | Forslow ....................... 370/352 |
| 2003/0093526 A1* | 5/2003 | Nandagopalan et al. ..... 709/225 |

| | | | |
|---|---|---|---|
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0022191 A1* | 2/2004 | Bernet et al. | 370/230 |
| 2004/0114553 A1 | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1* | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0058068 A1* | 3/2005 | Ben Ali et al. | 370/230 |
| 2005/0073997 A1* | 4/2005 | Riley et al. | 370/352 |
| 2005/0114541 A1* | 5/2005 | Ghetie et al. | 709/232 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasieiski et al. | 370/331 |
| 2005/0201324 A1* | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1 | 4/2006 | Rune | 370/328 |
| 2006/0092879 A1* | 5/2006 | Jeong et al. | 370/331 |
| 2006/0116113 A1 | 6/2006 | Gass | 455/414.4 |
| 2006/0126630 A1* | 6/2006 | Shirazipour et al. | 370/392 |
| 2006/0171310 A1 | 8/2006 | Ahluwalia et al. | 370/229 |
| 2006/0251038 A1 | 11/2006 | Tamura et al. | 370/342 |
| 2006/0264207 A1 | 11/2006 | Tamura et al. | 455/415 |
| 2006/0268819 A1 | 11/2006 | Chen et al. | 370/349 |
| 2007/0008882 A1* | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |
| 2007/0121615 A1 | 5/2007 | Weill et al. | 370/389 |
| 2007/0121642 A1 | 5/2007 | Battin et al. | 370/395.2 |
| 2007/0153720 A1 | 7/2007 | Baglin et al. | 370/328 |
| 2007/0254661 A1 | 11/2007 | Chowdhury | 455/436 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At Supercomm; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

Draft—TR45—PN-3-4732-RV4 (to be published as TIA-835.1-D), 32 pages.

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings (2104), filed May 19, 2006.
Yegani et al., "System and Method for Handover of an Access Terminal in a Communication Network," U.S. Appl. No. 11/682,735, 24 pps, 3 pps drawings (2360), filed Mar. 6, 2007.
Yegani et al., "Enforcement of User Level Policies from Visited Networks in a Mobile IP Environment," U.S. Appl. No. 11/682,817, 22 pps, 2 pps drawings (2359), filed Mar. 6, 2007.
Yegani et al, Authentication of Access Terminals in a Cellular Communication Network,: U.S. Appl. No. 11/682,857, 28 pps, 5 pps drawings (2358), filed Mar. 6, 2007.
Andreasen et al., "System and Method of Consolidating Accounting Data for a Communication Session," U.S. Appl. No. 11/714,974, 40 pps, 3 pps drawings (2404), filed Mar. 6, 2007.
Panda et al., "System and Method for Capturing Accounting Data for a Communication Session," U.S. Appl. No. 11/715,018 (2402), filed Mar. 6, 2007.
Rosenberg et al., "System and Method for Determining a Network for Processing Applications for a Communication Session," U.S. Appl. No. 11/715,019, 40 pps, 3 pps drawings (2406), filed Mar. 6, 2007.
Rosenberg et al., "Determining a Policy Output for a Communication Session," U.S. Appl. No. 11/715,032, 31 pps, 4 pps drawings (2368), filed Mar. 6, 2007.
Leung et al., "Communicating Packets Using a Home Anchored Bearer Path," U.S. Appl. No. 11/715,033, 33 pps, 4 pps drawings (2407), filed Mar. 6, 2007.
Andreasen et al., "Posture-Based Network Authentication," U.S. Appl. No. 11/715,040, 23 pages, 2 pps drawings (2398), filed Mar. 6, 2007.
Iyer et al., "Access Terminal for Communicating Packets Using a Home Anchored Bearer Path," U.S. Appl. No. 11/715,041, 33 pps, 4 pps drawings (2300), filed Mar. 6, 2007.
Rosenberg et al., "System and Method for Exchanging Policy Information in a Roaming Communications Environment," U.S. Appl. No. 11/715,056, 42 pps, 3 pps drawings (2416), filed Mar. 6, 2007.
Rosenberg et al., "Establishing Facets of a Policy for a Communication Session," U.S. Appl. No. 11/715,065, 32 pps, 4 pps drawings (2409), filed Mar. 6, 2007.
Rosenberg et al., "Performing Deep Packet Inspection for a Communication Session," U.S. Appl. No. 11/715,073, 31 pps, 4 pps drawings (2400), filed Mar. 6, 2007.
Rosenberg et al., "Assigning a Serving- CSCF During Access Authentication," U.S. Appl. No. 11/715,074, 22 pps, 2 pps drawings, (2410), filed Mar. 6, 2007.
Rosenberg et al., "System and Method for Providing Emergency Services in a Visited Communications Environment," U.S. Appl. No. 11/715,111, 39 pps, 2 pps drawings (2418), filed Mar. 6, 2007.
Panda et al., "Application-Aware Policy Enforcement," U.S. Appl. No. 11/715,187, 28 pps, 2 pps drawings (2403), filed Mar. 6, 2007.
Andreasen et al., "System and Method for Generating a Unified Accounting Record for a Communication Session," U.S. Appl. No. 11/715,210, 46 pps, 3 pps drawings (2399), filed Mar. 6, 2007.
Andreasen et al.,; "Policy-Based Control of Content Intercept", U.S. Appl. No. 11/715,251, 23 pps, 2 pps drawings (2401).
Rosenberg et al., "System and Method for Network Charging Using Policy Peering," U.S. Appl. No. 11/715,256, 43 pps, 3 pps drawings (2415), filed Mar. 6, 2007.
PCT Notification of Transmittal of the International Search Report and the Written Opinion of the International Searching Authority, or the Declaration with attached PCT International Search Report and Written Opinion of the International Searching Authority in International Application No. PCT/US07/05904, dated Apr. 8, 2008, 13 pages.
PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages, Nov. 10, 2008.

* cited by examiner

NETWORK-TRIGGERED QUALITY OF SERVICE (QOS) RESERVATION

RELATED APPLICATION

This Application claims the benefit, under 35 U.S.C. §119 (e), of Provisional Patent Application No. 60/780,176, filed Mar. 6, 2006 which is incorporated herein by reference.

TECHNICAL FIELD

The present disclosure relates generally to communication systems.

BACKGROUND

An endpoint that wants to transmit or receive packets may benefit from getting quality of service (QoS) for the communication of the packets. To ensure that sufficient resources will be available for a particular flow of packets, the endpoint usually has to request QoS for the flow of packets. The endpoint typically requests the QoS using one or more Layer 2 mechanisms specific to the type of network access in use or using a general Layer 3 mechanism, such as, for example, Resource Reservation Protocol (RSVP). In either case, the endpoint has to actively request the QoS.

DESCRIPTION OF EXAMPLE EMBODIMENTS

Overview

In one embodiment, a method includes a network originating a QoS reservation message and communicating the network-originated QoS message through a radio access network (RAN) from an access gateway (AGW) to an access terminal (AT). The network-originated reservation message does not cause any network resource reservation by itself, but causes the AT to initiate a network resource reservation according to one or more parameters in the network-originated QoS reservation message. Accordingly, an existing network infrastructure supporting AT-originated QoS reservation may support network-originated QoS reservation (or proxied QoS) without any updates to an access-network infrastructure, such as the RAN. The method includes, in response to the network-initiated QoS reservation message, communicating a reservation confirmation through the RAN from the AT to the AGW. The reservation confirmation indicates whether the QoS reservation was successful.

DESCRIPTION

Figure 1:
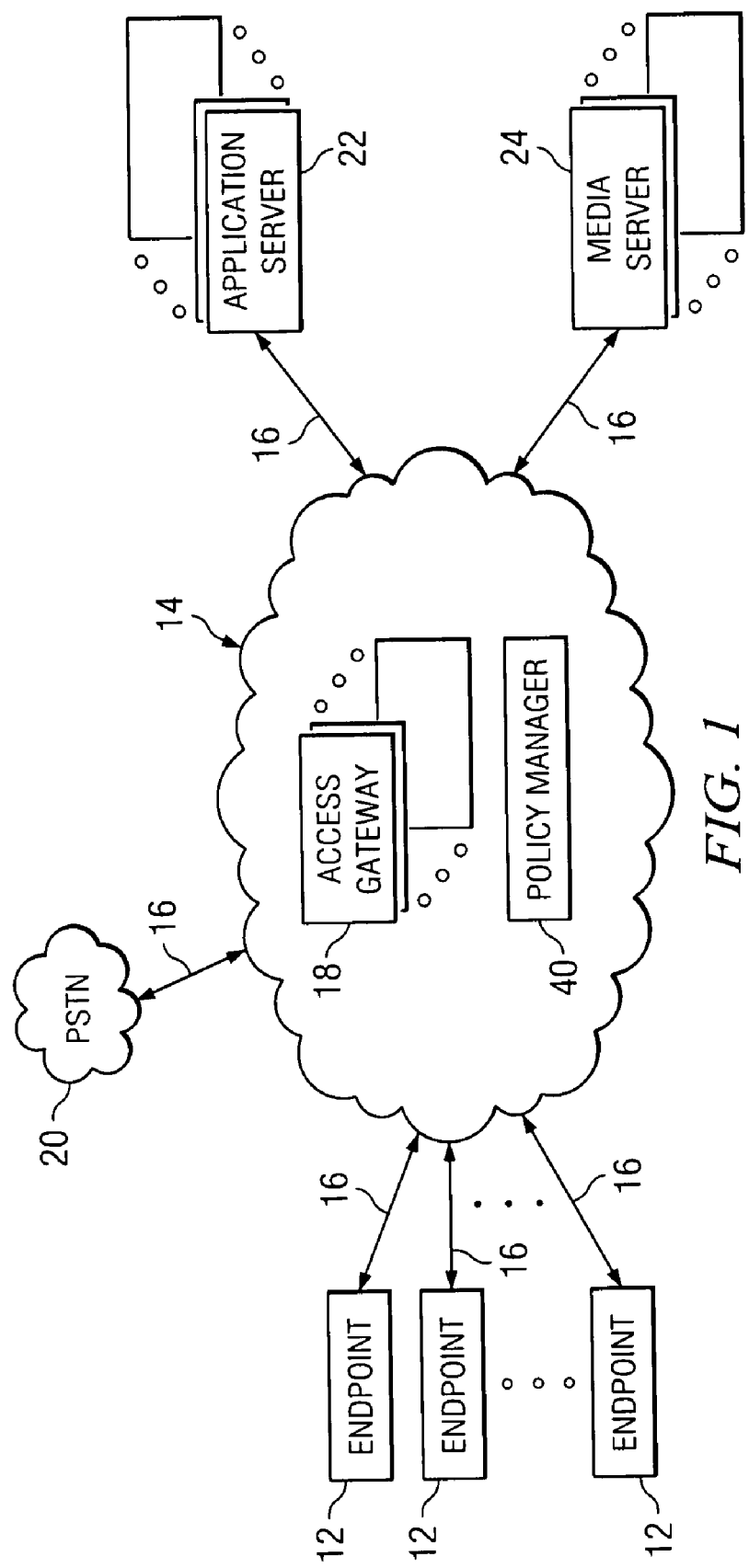
FIG. 1 illustrates an example system for network-triggered QoS reservation.

FIG. 1 illustrates an example system 10 for network-triggered QoS reservation. System 10 includes one or more endpoints 12 coupled to a network 14. One or more application servers 22, one or more media servers 24, and the Public Switched Telephone Network (PSTN) 20 are also coupled to network 14. Endpoints 12 communicate with each other and with application servers 22, media servers 24, and PSTN 20 via network 14. In particular embodiments, network 14 includes a local area network (LAN), a wireless LAN (WLAN), a wide area network (WAN), a metropolitan area network (MAN), a portion of the Internet, or another network 14 or a combination of two or more such networks 14. The present disclosure contemplates any suitable network 14 or combination of networks 14. As an example and not by way of limitation, one or more portions of network 14 may provide a Code Division Multiple Access (CDMA) Evolution Data Optimized (EVDO)-based wireless network infrastructure. One or more portions of network 14 may have a Multimedia Domain Plus (MMD+) or similar system architecture.

One or more links 16 couple an endpoint 12 to network 14. Similarly, one or more links 16 couple one or more application servers 22 to network 14, one or more links 16 couple one or more media servers 24 to network 14, and one or more links 16 couple PSTN 20 to network 14. In particular embodiments, one or more links 16 each include one or more wireline, wireless, or optical links 16. In particular embodiments, one or more links 16 each include a LAN, a WLAN, a WAN, a MAN, a radio access network (RAN), a portion of the Internet, or another link 16 or a combination of two or more such links 16. As an example and not by way of limitation, a link 16 between one or more endpoints 12 (such as, for example, EVDO Rev A-based ATs) and network 14 may include a RAN that has a particular coverage area and provides Layer 2 mobile access, QoS, mobility, and handoff services in its particular coverage area. The RAN may include one or more radio resource managers (RRMs) and one or more base transceiver stations (BTSs). The RAN may receive and participate in responding to QoS requests for endpoints 12. The RAN may communicate registration request messages (such as, for example, A11 registration request (RRQ) messages) to an access gateway 18 via one or more portions of link 16. The present disclosure contemplates any suitable links 16. In particular embodiments, one or more endpoints 12 share with each other one or more portions of one or more links 16 to network 14. Similarly, in particular embodiments, one or more application servers 22, media servers 24, or both share with each other one or more portions of one or more links 16 to network 14. In particular embodiments, one or more first links 16 may differ from one or more second links 16. As an example and not by way of limitation, a first link 16 including a RAN may couple one or more endpoints 12 (such as, for example, EVDO Rev A-based ATs) to network 14 and a second link including a PSTN gateway may couple PSTN 20 to network 14. The PSTN gateway may reside wholly or partially in network 14. In particular embodiments, one or more links 16 may each include one or more components that reside in network 14. A link 16 need not necessarily terminate outside network 14. The present disclosure contemplates any suitable arrangements of any suitable links 16 coupling endpoints 12, application servers 22, media servers 24, and PSTN 20 to network 14.

In particular embodiments, an application server 22 provides one or more applications to one or more endpoints 12. As an example and not by way of limitation, an application may include one or more Session Initiation Protocol (SIP)-based communication applications, such as, for example, Internet Protocol (IP) telephony. As another example, an application may include one or more non SIP-based applications, such as, for example, video streaming, gaming, or collaboration. An endpoint 12 may invoke a SIP-based communication application at application server 22 through an application manager in network 14. The application manager may be a hardware, software, or embedded logic component or a combination of two or more such components facilitating integration of the application domain of network 14 into a policy framework and a security infrastructure of network 14.

An endpoint 12 may invoke an application at an application server 22 or the application manager. Application server 22 or the application manager may interact with policy manager 40 to authorize QoS for the application. Policy manager 40 may also be known as a policy server. Endpoint 12 may actively request QoS for the application invocation, which may cause an access gateway 18 to receive a reservation request message. Access gateway 18 may in turn interact with policy manager 40 for a policy decision on whether to grant the reservation request. As a result, in prior methods and systems, endpoint 12 only receives QoS when endpoint 12 actively requests it. However, an application server 22 may want an endpoint 12 to receive QoS, even if endpoint 12 has not requested it. As an example and not by way of limitation, endpoint 12 may invoke an application at application server 22 without requesting QoS for the invoked application because an application at endpoint 12 does not know how to request QoS. Particular embodiments enable provision of QoS in such cases.

An endpoint 12 may invoke non SIP-based applications at application server 22 directly, but policy manager 40 may manage access to the network resources. Policy manager 40 may also coordinate network resources supporting delivery of the non SIP-based applications. In particular embodiments, one or more first application servers 22 provide SIP-based communication applications and one or more second application servers 22 provide non SIP-based communication applications. In particular embodiments, application servers 22 providing SIP-based communication applications reside in network 14 on top of an application manager. In particular embodiments, an application server 22 may be either stand-alone or user-specific. As an example and not by way of limitation, a stand-alone application server 22 may provide general application services, which users at endpoints 12 may invoke explicitly by reference to the name of their associated services, for example, via a specific SIP uniform resource identifier (URI), a telephone number, or a dial string. Provision of the general application services need not involve originating or terminating call/request treatment. A user-specific application server 22 may provide application services that involve originating or terminating call/request treatment. An application server 22 may also be present inside access gateway 18, or any other network element in network 14. Application server 22 may for example be an application proxy for an application detected by use of deep packet inspection or packet flow optimization. An application server for SKYPE may for example be provided this way. In particular embodiments, invocation of such applications enable provision of QoS for those applications. The present disclosure contemplates any suitable application servers 22 providing any suitable applications to endpoints 12, whether directly or indirectly.

In particular embodiments, media servers 24 provide one or more media processing functions to one or more application servers 22. As an example and not by way of limitation, media processing functions may include interactive voice response (IVR), mixing functions, transcoding, announcement functions, messaging functions, and other functions supporting bearer-related services. Media processing functions may be service enablers, e.g., coarse-grained application components that tend to lack utility by themselves, but are useful to other applications. In particular embodiments, one or more media servers 24 are integrated into one or more application servers 22. In particular embodiments, one or more media servers 24 are stand-alone resources relative to one or more SIP application servers 26 subject to control by typical SIP procedures, such as the use of INVITE messages.

In particular embodiments, an endpoint 12 enables a user at endpoint 12 to communicate with one or more users at one or more other endpoints 12, communicate with one or more users at one or more telephones or other devices across PSTN 20, or both. As an example and not by way of limitation, an endpoint 12 may be an EVDO Rev A-based AT. An endpoint 12 may be a mobile IP telephone. An endpoint 12 may be a dual-mode telephone including both EVDO Rev A or other cellular functionality and mobile IP functionality. An endpoint 12 may be a personal digital assistant (PDA) including EVDO Rev A or other cellular functionality, mobile IP functionality, or both. An endpoint 12 may be a network-enabled media player including EVDO Rev A or other cellular functionality, mobile IP functionality, or both. Herein, reference to media encompasses audio, video, other media, or a combination of two or more such media. An endpoint 12 may be a network-enabled still or video camera. An endpoint 12 may be a notebook computer system, which may run a telephony application such as, for example, SKYPE. An endpoint 12 may include one or more unattended or automated systems (such as for example, video cameras, video monitors, or gateways or other intermediate components) or other devices capable of communicating to or from network 14. Herein, reference to an endpoint 12 encompasses one or more ATs, and vice versa, where appropriate. The present disclosure encompasses any suitable endpoints 12.

As an example and not by way of limitation, endpoint 12 may receive a reservation message (RESV message) from an access gateway 18 and, in response to the RESV message, generate an airlink reservation for communication to a RAN in a link 16 coupling endpoint 12 to network 14. The airlink reservation may be a flow QoS request for the RAN. The RAN may in turn communicate a message back to endpoint 12 indicating that the RAN has granted the airlink reservation. The RESV message from access gateway 18 may include one or more traffic filter templates (TFTs), one or more flow identifiers (IDs), and one or more QoS parameters, as described below. The airlink reservation may include a request to the RAN to reserve QoS (which may correspond to one or more parameters in the RESV message from access gateway 18) for endpoint 12. Endpoint 12 may use information in the TFTs in the RESV message to determine which packets originating at endpoint 12 should receive the benefit of the reserved QoS. Endpoint 12 may use the information in the TFTs to map packets originating at endpoint 12 to a particular airlink flow. Endpoint 12 may have the flexibility to adjust the QoS reservation in response to changing airlink conditions. Subsequent to endpoint 12 receiving the RESV message from access gateway 18 and endpoint 12 successfully performing an airlink reservation, endpoint 12 may generate a reservation confirmation message (RESVCONF message) and communicate the RESVCONF message to access gateway 18. The RESVCONF message may notify access gateway 18 whether the QoS reservation was successful. An alternative to this method is for access gateway 18 to communicate directly with the RAN, and ask for it to install a QoS reservation for endpoint 12. This however may require significant and expensive changes in the RAN and its associated communication interfaces. Particular embodiments avoid these drawbacks by sending a network-initiated QoS reservation message to the AT, which in turn triggers the AT to use existing QoS reservation mechanism to reserve network resources. The AT then communicates the outcome of this resource reservation to access gateway 18.

Network 14 includes one or more access gateways 18. In particular embodiments, network 14 also includes an application manager, a bearer manager, policy manager 40, a security manager, and a services data manager (SDM). In particular embodiments, network 14 also includes a PSTN gateway facilitating communication between network 14 and PSTN 20. In particular embodiments, components of network 14 are distributed across multiple cities or geographical regions. In particular embodiments, components of network 14 use IP, SIP, or both (possibly in addition to one or more other protocols, such as Real-Time Streaming Protocol (RTSP)) to communicate with each other. In particular embodiments, components of network 14 use IP, SIP, or both to communicate with endpoints 12, application servers 22, and media servers 24. Herein, reference to IP encompasses any suitable version of IP, such as IPv4, Mobile IPv6, or a combination of the two, where appropriate. In particular embodiments, network 14 is a packet-switched network 14, and components of network 14 communicate packets to and from each other. As an example and not by way of limitation, a packet communicated from one or more first components of network 14 to one or more second components of network 14 may include bearer data (such as for example, audio data, video data, voice data, other data, or a combination of such bearer data), signaling data, or both. Herein, reference to a packet encompasses a cell, a frame, a datagram, or another unit of data or a combination of two or more such packets, where appropriate.

An access gateway 18 includes a hardware, software, or embedded logic component or a combination of two or more such components providing an interface between network 14 and one or more networks or other systems outside network 14. In particular embodiments, one or more access gateways 18 are IP gateways. In particular embodiments, one or more access gateways 18 are bearer managers, packet data serving nodes (PDSNs), home agents, access service network (ASN) gateways, serving general packet radio service (GPRS) support nodes (SGSNs), or gateway GPRS support nodes (GGSNs).

As an example and not by way of limitation, an access gateway 18 may provide an interface between network 14 and a RAN in a link 16 coupling one or more endpoints 12 to network 14. Access gateway 18 may include functionality for encoding, decoding, and transcoding, as needed, to enable the communication of data between network 14 and the RAN. In particular embodiments, an access gateway 18 uses an A10, A11, or A12 interface according to an appropriate CDMA scheme to communicate with one or more RANs. In particular embodiments, an access gateway 18 participates in registering an endpoint to network 14. In particular embodiments, an access gateway 18 participates in handoffs of endpoints 12 between RANs.

In particular embodiments, an access gateway 18 is an enforcement point for network access with respect to one or more endpoints 12. As an example and not by way of limitation, an access gateway 18 may be at least partly responsible for authenticating endpoints 12 to network 14. Access gateway 18 may use an Extensible Authentication Protocol (EAP) exchange with an endpoint 12 to authenticate endpoint 12 to network 14. In particular embodiments, to stimulate a QoS reservation for an endpoint 12, an access gateway 18 generates a RESV message and communicates the RESV message to endpoint 12. A policy message received by access gateway 18 from policy manager 40 may have caused access gateway 18 to generate the RESV message, a policy request from an application server 22 to policy manager 40 may have caused policy manager 40 to generate the policy message, and an application message from endpoint 12 to application server 22 may have caused application server 22 to generate the policy request. However, endpoint 12 may have failed to reserve network resources. In particular embodiments, the network elements between access gateway 18 and endpoint 12 do not reserve any QoS as a result of receiving and forwarding the RESV message sent by access gateway 18; the network elements simply forward the RESV message as any other packet. Communication of the RESV message from access gateway 18 to endpoint 12 may obviate the need for endpoint 12 to actively request QoS. Communication of the RESV message from access gateway 18 to endpoint 12 may also enable QoS reservation for endpoints 12 that otherwise would not request QoS for particular applications, such as endpoints 12 supporting interactive online gaming applications that the game developers have not added QoS support to. In particular embodiments, an access gateway 18 provides a QoS proxy for an endpoint 12 requesting one or more services from network 14. Particular embodiments may effect QoS reservation using Layer 3 mechanisms. As an example and not by way of limitation, a RESV message from an access gateway 18 may be an IP-based message and may include one or more TFTs, one or more flow IDs, and one or more QoS parameters. In particular embodiments, a TFT may be constructed based on interaction with policy manager 40 or directly with an application manager, as described above.

In particular embodiments, a TFT includes one or more 5-tuples (which may each specify a source IP address, a source port, a destination IP address, a destination port, and a protocol for communication between the source and the destination) and one or more security parameter indices (SPIs). A TFT may include one or more of the 5-tuple elements, and each of the elements may either contain a specific value (such as an IP address) or a wild-carded value (such as an IP-address range or a port range). A TFT need not include all the 5-tuple elements. In particular embodiments, a TFT enables an access gateway 18 to match traffic to or from an endpoint 12 with a particular data flow traversing network 14. In particular embodiments, a RESV message includes a forward TFT, a reverse TFT, or both. As an example and not by way of limitation, the forward TFT may specify a data flow from an access gateway 18 to an endpoint 12 and a reverse TFT may specify a data flow from an endpoint 12 to an access gateway 18. In particular embodiments, a flow ID is a unique number identifying a particular data flow. As an example and not by way of limitation, a flow ID may identify an unidirectional data flow. As another example, a flow ID may identify a bidirectional data flow. An endpoint 12 and a RAN in a link 16 coupling endpoint 12 to network 14 (and possibly other components of system 10) may use a flow ID to match a particular data flow to a particular QoS.

Herein, reference to QoS encompasses a level of performance that network 14 and possibly other components of system 10 accord to a data flow. QoS reservation may be important when resources in network 14 are constrained or otherwise limited. QoS reservation may facilitate delivery of real-time streaming media applications (such as, for example, voice over IP (VoIP)) because such applications often require a guaranteed bit-rate and are often sensitive to delay, packet loss, or both. In particular embodiments, a QoS parameter includes a bandwidth reservation, a packet marker, a traffic shaper or policer, an authorization envelope, or a combination of two or more such parameters. As an example and not by way of limitation, a bandwidth reservation may specify a minimum amount of bandwidth for a data flow. A packet marker may set a differentiated service codepoint in all packets in a data flow. A traffic shaper or policer may identify packets for dropping, marking, or shaping. An authorization envelope may specify a maximum amount of bandwidth for an endpoint 12. If endpoint 12 requests bandwidth in excess of the authorization envelope, the request may trigger an authorization request to policy manager 40. A combination of a bandwidth reservation and an authorization envelope may be a gate.

In particular embodiments, network-triggered QoS reservation (also known as proxied QoS) does not occur by itself. Proxied QoS instead occurs under the instruction of policy manager 40, which in Third Generation Partnership Project 2 (3GPP2)-based networks (such as EVDO) uses the Ty interface. In the A-IMS architecture, policy manager 40 provides instructions for proxied QoS indirectly through a bearer manager (which uses the Ty interface) in network 14. Particular embodiments extend the Ty interface or a similar interface (such as, for example, Gx in Third Generation Partnership Project (3GPP)) to include instructions for proxied QoS. Particular embodiments extend the Ty interface to provide at least (1) an indication that proxied QoS is to be performed, (2) a specification of the TFTs to apply (forward and reverse), and (3) a specification of the QoS to reserve.

Figure 2:
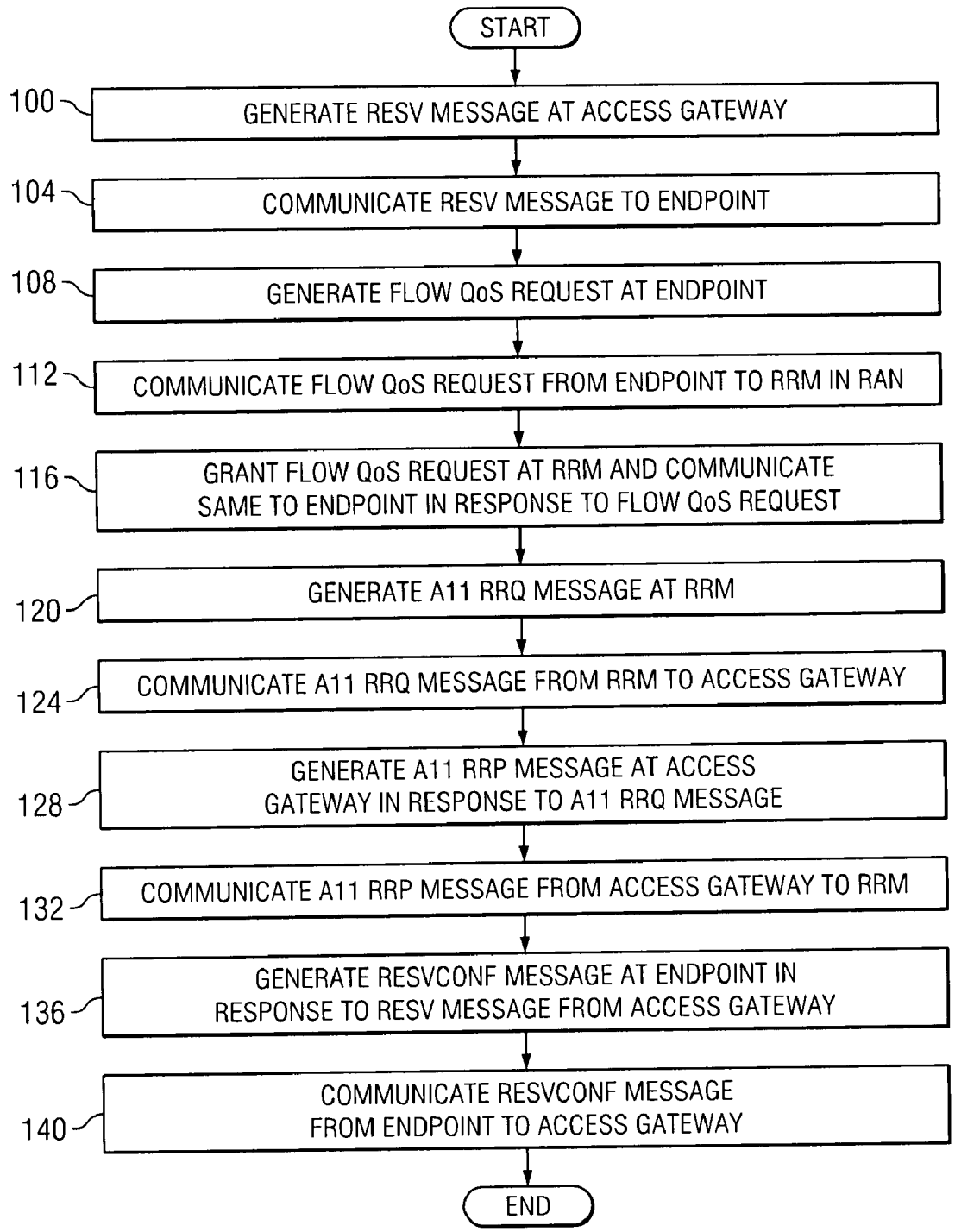
FIG. 2 illustrates an example method for network-triggered QoS reservation.

FIG. 2 illustrates an example method a network-triggered QoS reservation. The method begins at step 100, where an access gateway 18 generates a RESV message for an endpoint 12, for example, because the AT invoked an application that interacted with policy manager 40, which in turn instructed access gateway 18 to reserve resources for the AT. As described above, the RESV message may include one or more traffic filter templates, one or more flow IDs, and one or more QoS parameters. At step 104, access gateway 18 communicates the RESV message to endpoint 12. At step 108, endpoint 12 receives the RESV message and generates a flow QoS request (which may be an airlink reservation) for communication to an RRM in a RAN in a link 16 coupling endpoint 12 to network 14. At step 112, endpoint 12 communicates the flow QoS request to the RRM. At step 116, the RRM grants the flow QoS request and communicates a message to endpoint 12 indicating that the RRM has granted the flow QoS request. In particular embodiments, granting the flow QoS request requires no changes to an air interface between endpoint 12 and the RAN, which facilitates as-is use of existing EVDO signaling. At step 120, the RRM generates an A11 RRQ message informing access gateway 18 that the RRM has granted the flow QoS request. At step 124, the RRM communicates the A11 RRQ message to access gateway 18. At step 128, in response to the A11 RRQ message, access gateway 18 generates an A11 registration reply (RRP) message confirming receipt of the A11 RRQ message. At step 132, access gateway 18 communicates the A11 RRP message to the RRM. At step 136, in response to the RESV message from access gateway 18, endpoint 12 generates a RESVCONF message informing access gateway 18 that the QoS reservation specified in the RESV message has succeeded and endpoint 12 has mapped the flow ID in the RESV message to the one or more TFTs in the RESV message. At step 140, endpoint 12 communicates the RESVCONF message to access gateway 18, at which point the method ends.

Although particular embodiments use RESV and RESVCONF messages, the present disclosure contemplates any suitable IP-based protocol for reserving QoS. Moreover, although particular embodiments are directed to EVDO-based access networks, the present disclosure contemplates any suitable type of access network. Although particular steps of the method illustrated in FIG. 2 are described and illustrated as occurring in a particular order, the present disclosure contemplates any suitable steps of the method illustrated in FIG. 2 occurring in any suitable order. Moreover, although particular components of FIG. 1 are described and illustrated as executing particular steps of the method illustrated in FIG. 2, the present disclosure contemplates any suitable components executing any suitable steps of the method illustrated in FIG. 2.

The present disclosure encompasses all changes, substitutions, variations, alterations, and modifications to the example embodiments described herein that a person having ordinary skill in the art would comprehend. Moreover, none of the methodology described herein should be construed as a limitation on the order of events insofar as one of skill in the art would appreciate that such events could be altered without departing from the scope of the invention. Similarly, where appropriate, the appended claims encompass all changes, substitutions, variations, alterations, and modifications to the example embodiments described herein that a person having ordinary skill in the art would comprehend.

What is claimed is:

1. A method comprising:

generating at an access gateway (AGW) a reservation message for an access terminal (AT), the reservation message comprising quality of service (QoS) reservation parameters, the QoS reservation parameters comprising at least one or more traffic filter templates (TFTs) and a QoS;

communicating the reservation message from the AGW to the AT to initiate reservation of resources, the communication of the reservation message from the AGW to the AT enabling the AT to reserve QoS for an application that lacks QoS support;

attempting to reserve QoS according to the QoS reservation parameters in the reservation message from the AGW, the attempt to reserve QoS comprising one or more processes originating at the AT;

determining at the AT a result of the attempt to reserve QoS;

generating at the AT a reservation confirmation message indicating the result of the attempt to reserve QoS; and communicating the reservation confirmation message from the AT to the AGW;

receiving at an application server a request from the AT to invoke the application, the request not requesting QoS for the application;

in response to the request from the AT, generating at the application server a policy request and communicating the policy request to a policy server; and generating at the policy server a policy message and communicating the policy message to the AGW to cause the AGW to generate the reservation message.

2. The method of claim 1, wherein:

communicating the reservation message from the AGW to the AT comprises communicating the reservation message from the AGW to the AT via a radio access network (RAN); and communicating the reservation confirmation message from the AT to the AGW comprises communicating the reservation confirmation message from the AT to the AGW via the RAN.

3. The method of claim 1, wherein the AGW comprises an Internet Protocol (IP) gateway.

4. The method of claim 1, wherein the AT is a personal digital assistant (PDA).

5. The method of claim 1, wherein each of the TFTs specifies one or more of:

a source comprising a source Internet Protocol (IP) address and a source port;

a destination comprising a destination IP address and a destination port;

a protocol for communication between the source and the destination; or one or more security parameter indices (SPIs).

6. The method of claim 1, wherein the QoS reservation parameters derive from interaction between the AGW and either a policy manager or an application manager.

7. The method of claim 1, wherein each of the TFTs specifies one or more of:
a source comprising a source Internet Protocol (IP) address, a source port, or both, the source IP address, the source port, or both being identified by one or more specific values or one or more wildcards;
a destination comprising a destination IP address, a destination port, or both, the destination IP address, the destination port, or both being identified by one or more specific values or one or more wildcards;
a protocol for communication between the source and the destination; or
one or more security parameter indices (SPIs).

8. The method of claim 1, wherein a first one of the TFTs comprises a forward TFT and a second one of the TFTs comprises a reverse TFT.

9. The method of claim 1, wherein the QoS reservation parameters further comprise a flow identifier (ID) comprising a number identifying a unique instantiation of a communication session between a source and a destination according to a particular protocol.

10. The method of claim 1, wherein the QoS reservation parameters further comprise a flow identifier (ID) identifying a unidirectional Internet Protocol (IP) flow.

11. The method of claim 1, wherein the QoS reservation parameters further comprise a flow identifier (ID) and a mapping of the flow ID to the TFT for the QoS reservation.

12. The method of claim 1, wherein the QoS reservation comprises a reservation of bandwidth.

13. An apparatus comprising:
an interface operable to communicate with a network;
one or more processors; and
a memory coupled to the processors comprising one or more instructions, the processors operable when executing the instructions to:
receive a reservation message communicated from an access gateway (AGW) in the network to initiate reservation of resources, the reservation message comprising quality of service (QoS) reservation parameters, the QoS reservation parameters comprising at least one or more traffic filter templates (TFTs) and a QoS, the communication of the reservation message from the AGW to an AT enabling the AT to reserve QoS for an application that lacks QoS support;
attempt to reserve QoS according to the QoS reservation parameters in the reservation message from the AGW, the attempt to reserve QoS comprising one or more processes originating at the AT;
determine at the AT a result of the attempt to reserve QoS;
generate at the AT a reservation confirmation message indicating the result of the attempt to reserve QoS;
communicate the reservation confirmation message from the AT to the AGW; and
send a request to an application server to invoke the application, the request not requesting QoS for the application, the request operable to cause the application server to generate a policy request and communicate the policy request to a policy server, the policy server operable in response to the policy request to generate a policy message and communicate the policy message to the AGW to cause the AGW to generate the reservation message.

14. The apparatus of claim 13, wherein:
receiving the reservation message from the AGW comprises receiving the reservation message from the AGW via a radio access network (RAN); and
communicating the reservation confirmation message from the AT to the AGW comprises communicating the reservation confirmation message from the AT to the AGW via the RAN.

15. The apparatus of claim 13, wherein each of the TFTs specifies one or more of:
a source comprising a source Internet Protocol (IP) address and a source port;
a destination comprising a destination IP address and a destination port;
a protocol for communication between the source and the destination; or
one or more security parameter indices (SPIs).

16. The apparatus of claim 13, wherein the QoS reservation parameters derive from interaction between the AGW and either a policy manager or an application manager.

17. The apparatus of claim 13, wherein a first one of the TFTs comprises a forward TFT and a second one of the TFTs comprises a reverse TFT.

18. The apparatus of claim 13, wherein the QoS reservation comprises a reservation of bandwidth.

19. An apparatus comprising:
an interface operable to communicate with an access terminal (AT);
one or more processors; and
a memory coupled to the processors comprising one or more instructions, the processors operable when executing the instructions to:
generate at an access gateway (AGW) a reservation message for the AT, the reservation message comprising quality of service (QoS) reservation parameters, the QoS reservation parameters comprising at least one or more traffic filter templates (TFTs) and a QoS;
communicate the reservation message from the AGW to the AT to initiate reservation of resources, the communication of the reservation message from the AGW to the AT enabling the AT to reserve QoS for an application that lacks QoS support; and
receive a reservation confirmation message at the AGW from the AT, the reservation confirmation message indicating a result of an attempt to reserve QoS according to the QoS reservation parameters in the reservation message from the AGW, the attempt to reserve QoS having comprised one or more processes originating at the AT; and
generate the reservation message at the AGW in response to receiving a policy message communicated to the AGW from a policy server, the policy message generated at the policy server in response to receiving a policy request from an application server that received a request from the AT to invoke the application, the request not requesting QoS for the application.

20. The apparatus of claim 19, wherein:
communicating the reservation message from the AGW to the AT comprises communicating the reservation message from the AGW to the AT via a radio access network (RAN); and
receiving the reservation confirmation message from the AT at the AGW comprises receiving the reservation confirmation message from the AT at the AGW via the RAN.

21. The apparatus of claim 19, wherein each of the TFTs specifies one or more of:
- a source comprising a source Internet Protocol (IP) address and a source port;
- a destination comprising a destination IP address and a destination port;
- a protocol for communication between the source and the destination; or
- one or more security parameter indices (SPIs).

22. The apparatus of claim 19, wherein the QoS reservation parameters derive from interaction between the AGW and either a policy manager or an application manager.

23. The apparatus of claim 19, wherein a first one of the TFTs comprises a forward TFT and a second one of the TFTs comprises a reverse TFT.

24. The apparatus of claim 19, wherein the QoS reservation comprises a reservation of bandwidth.

25. A system comprising:
an access gateway (AGW) operable to:
- generate a reservation message for an access terminal (AT), the reservation message comprising quality of service (QoS) reservation parameters, the QoS reservation parameters comprising at least one or more traffic filter templates (TFTs) and a QoS; and
- communicate the reservation message from the AGW to the AT to initiate reservation of resources, the communication of the reservation message from the AGW to the AT enabling the AT to reserve QoS for an application that lacks QoS support;

the AT, operable to:
- attempt to reserve QoS according to the QoS reservation parameters in the reservation message from the AGW, the attempt to reserve QoS comprising one or more processes originating at the AT;
- determine a result of the attempt to reserve QoS;
- generate a reservation confirmation message indicating the result of the attempt to reserve QoS; and
- communicate the reservation confirmation message to the AGW;

an application server operable to:
- receive a request from the AT to invoke the application, the request not requesting QoS for the application; and
- in response to the request from the AT, generate a policy request and communicate the policy request to a policy server; and the policy server, operable to generate a policy message and communicate the policy message to the AGW to cause the AGW to generate the reservation message.

26. The system of claim 25, wherein:
communicating the reservation message from the AGW to the AT comprises communicating the reservation message from the AGW to the AT via a radio access network (RAN); and
communicating the reservation confirmation message from the AT to the AGW comprises communicating the reservation confirmation message from the AT to the AGW via the RAN.

27. The system of claim 25, wherein each of the TFTs specifies one or more of:
- a source comprising a source Internet Protocol (IP) address and a source port;
- a destination comprising a destination IP address and a destination port;
- a protocol for communication between the source and the destination; or
- one or more security parameter indices (SPIs).

28. The system of claim 25, wherein the QoS reservation parameters derive from interaction between the AGW and either a policy manager or an application manager.

29. The system of claim 25, wherein a first one of the TFTs comprises a forward TFT and a second one of the TFTs comprises a reverse TFT.

30. The system of claim 25, wherein the QoS reservation comprises a reservation of bandwidth.

31. An apparatus comprising:
one or more processors; and
a memory coupled to the processors comprising one or more instructions, the processors operable when executing the instructions to:
using an interface, communicate to an access gateway (AGW) instructions for proxied quality of service (QoS), the instructions prompting the AGW to:
- generate a reservation message for an AT, the reservation message comprising QoS reservation parameters, the QoS reservation parameters comprising at least one or more traffic filter templates (TFTs) and a QoS; and
- communicate the reservation message from the AGW to the AT to prompt the AT to attempt to reserve QoS according to the QoS reservation parameters, the communication of the reservation message from the AGW to the AT enabling the AT to reserve QoS for an application that lacks QoS support, the attempt to reserve QoS comprising one or more processes originating at the AT;
receive a policy request from an application server, the policy request generated at the application server in response to receiving a request from the AT to invoke the application, the request not requesting QoS for the application; and
in response to receiving the policy request, generate and communicate the instructions for proxied QoS to the AGW.

32. The apparatus of claim 31, wherein the interface comprises an extended Ty interface or an extended Gx interface.

33. The apparatus of claim 31, comprising a policy manager.

34. The method of claim 1, wherein the reservation message is generated at the AGW independent of a request for QoS for the application.

35. The method of claim 1, wherein the information in the reservation message enables the AT to determine which data packets originating from the AT should receive the benefit of the reserved QoS.

* * * * *